United States Patent
Ng et al.

(10) Patent No.: US 7,072,304 B2
(45) Date of Patent: Jul. 4, 2006

(54) NETWORK PATH SELECTION BASED ON BANDWIDTH

(75) Inventors: David D. Ng, Nepean (CA); Richard A. Stephens, Ottawa (CA); Yolaine Legare, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 997 days.

(21) Appl. No.: 10/106,781

(22) Filed: Mar. 27, 2002

(65) Prior Publication Data

US 2003/0161338 A1 Aug. 28, 2003

Related U.S. Application Data

(60) Provisional application No. 60/359,700, filed on Feb. 27, 2002.

(51) Int. Cl.
*H04L 1/00* (2006.01)
*H04L 12/56* (2006.01)

(52) U.S. Cl. ............... 370/238; 370/252; 370/254; 370/400

(58) Field of Classification Search ............ None
See application file for complete search history.

(56) References Cited

U.S. PATENT DOCUMENTS

| | | | | |
|---|---|---|---|---|
| 5,233,604 | A * | 8/1993 | Ahmadi et al. | 370/238 |
| 5,491,690 | A * | 2/1996 | Alfonsi et al. | 370/404 |
| 5,521,910 | A * | 5/1996 | Matthews | 370/256 |
| 6,061,736 | A * | 5/2000 | Rochberger et al. | 709/241 |
| 6,385,201 | B1 * | 5/2002 | Iwata | 370/400 |
| 6,483,808 | B1 * | 11/2002 | Rochberger et al. | 370/238 |
| 6,661,797 | B1 * | 12/2003 | Goel et al. | 370/395.21 |
| 6,842,427 | B1 * | 1/2005 | Evslin et al. | 370/252 |
| 6,993,593 | B1 * | 1/2006 | Iwata | 709/238 |

* cited by examiner

*Primary Examiner*—Andrew C. Lee
*Assistant Examiner*—Soon D. Hyun (57) ABSTRACT

Determining a predetermined number of paths from a source node to a destination node in a network with nodes interconnected by links having metric values. A path between the source node and a current node is determined and expanded using selected links connected to the current node. The expanded paths are evaluated based on a value for a selected metric to determine those expanded paths having desirable selected metric values. The expanded paths with desirable selected metric values are evaluated to determine the path having the highest available bandwidth for all distinct segments.

37 Claims, 6 Drawing Sheets

NETWORK PATH SELECTION BASED ON BANDWIDTH

CROSS REFERENCE TO RELATED APPLICATIONS

The present invention claims priority from U.S. provisional patent application 60/359,700 titled "Network path selection based on bandwidth" filed on Feb. 27, 2002.

FIELD OF THE INVENTION

The present invention relates to management of communications networks and in particular to selection of a path through a network according to available bandwidth of each path.

BACKGROUND OF THE INVENTION

Communications networks typically are configured with a plurality of nodes connected together by a plurality of links. A path through the network from one node to another may take a variety of different links and may pass through a variety of different nodes as there are often many ways to get from one node to another. A certain path will often be chosen according to various metrics that give different paths varying degrees of desirability. Each of the links has associated metrics used in determining the frequency with which that link is used in a path from one node in the network to another node. These metrics for choosing certain paths and links may include such factors as the speed of the link, the amount of traffic or the available bandwidth of the link, the cost of operating the link, the time delay for the link, the total length or time taken to travel the entire path, etc.

A path between nodes will be selected according to an optimum selection of one or more of the above metrics. As a result, the nodes and links with the most optimum metrics will be continuously selected. Consequently, these nodes and links will carry a majority of the traffic on the network causing them to easily become congested.

There may be multiple routes from one node to another node in the network that have similar values for one or more metrics but have vastly different values for other metrics. Determination of a path through the network based on values for one metric may yield many possible paths. One possible determination scheme for balancing traffic distribution amongst the possible paths is random selection of one of these paths for routing. However, this may not evenly distribute traffic as the total bandwidth and the available bandwidth for a path may vary among seemingly equivalent paths. Further, randomness may unbalance traffic loads in the network as paths carry different traffic loads.

SUMMARY OF THE INVENTION

Determining a predetermined number of paths from a source node to a destination node in a network with nodes interconnected by links having metric values. A path between the source node and a current node is determined and expanded using selected links connected to the current node. The expanded paths are evaluated based on a value for a selected metric to determine those expanded paths having desirable selected metric values. The expanded paths with desirable selected metric values are evaluated to determine the path having the highest available bandwidth for all distinct segments.

In accordance with one aspect of the present invention there is provided a method of selecting a path from a first set of paths each path having a similar path metric value and a path bandwidth metric value, each path extending through a network from a common source node to a common end node via intermediate nodes, the common source node, the common end node and the intermediate nodes being interconnected by a plurality of links, the method comprising: a) determining a second set of paths formed from paths in the first set having a desirable path bandwidth metric value; b) determining a first common node between two chosen paths from the second set, the first common node being an intermediate node for each of the two chosen paths, a segment of each of the two chosen paths between the common end node and the first common node defining a unique segment for each of the two paths each unique segment having a segment bandwidth metric value; c) determining a path from the two chosen paths based on a desirable segment bandwidth metric value from the segment bandwidth metric value for each of the two unique segments; and d) repeating steps b) and c) retaining the determined path as one of the two chosen paths until all paths in the second set of paths have been chosen.

In accordance with another aspect of the present invention there is provided a method of determining a path through a network from a source node to a destination node via intermediate nodes, the source node, the destination node and the intermediate nodes being interconnected by a plurality of links, each of the plurality of links having a first metric value and a link bandwidth metric value, the method comprising: a) determining a path from the source node, the path ending at a current node; b) forming expanded paths from the path using selected links from the current node, each of the expanded paths having a path metric value based on the first metric values of the links in each of the expanded paths; c) forming a first set of paths from expanded paths having a common end node based on the path metric value for each expanded path, each path in the first set having a path bandwidth metric value; d) determining a second set of paths formed from paths in the first set having a desirable path bandwidth metric value; e) determining a first common node between two randomly chosen paths from the second set, the first common node being an intermediate node for each of the two chosen paths, a segment of each of the two chosen paths between the common end node and the first common node defining a unique segment for each of the two paths, each unique segment having a segment bandwidth metric value; f) determining a path from the two chosen paths based on a desirable segment bandwidth metric value from the segment bandwidth metric value for each of the two unique segments; g) repeating steps e) and f) retaining the determined path as one of the two chosen paths until all paths in the second set have been chosen; and h) repeating steps a) to g) to further expand the determined path at each intermediate node until the end node for the determined path is the destination node.

In accordance with a further aspect of the present invention there is provided a system for determining a path through a network from a source node to a destination node via intermediate nodes, the source node, the destination node and the intermediate nodes being interconnected by a plurality of links, each of the plurality of links having a first metric value and a link bandwidth metric value, the system comprising: a data storage for holding path information for a path between the source node and a current node; a link search mechanism to select links from the current node; a controller operably connected to the data storage and the link search mechanism to locate and expand a path from the source node to the current node using the selected links to form expanded paths, each of the expanded paths having a path metric value based on the metric values for links in the expanded path and a path bandwidth metric value, and to determine a first set of paths having a common end node according to the path metric value for each of the expanded paths; a path bandwidth analysis mechanism to determine those paths in the first set having a desirable path bandwidth metric value; a segment determination mechanism to determine a first common node between two chosen paths from those paths having a desirable path bandwidth metric value, the first common node being an intermediate node for each of the two chosen paths, a segment of each of the two chosen paths between the common end node and the first common node defining a unique segment for each of the two paths, each unique segment having a segment bandwidth metric value; and a segment bandwidth determination mechanism to determine the determined path from the two chosen paths based on a desirable segment bandwidth metric value from the segment bandwidth metric value for each of the two unique segments.

In accordance with a further aspect of the present invention there is provided a computer readable medium having stored thereon computer-executable instructions for selecting a path from a first set of paths each path having a similar path metric value and a path bandwidth metric value, each path extending through a network from a common source node to a common end node via intermediate nodes, the common source node, the common end node and the intermediate nodes being interconnected by a plurality of links, the method comprising: a) determining a second set of paths formed from paths in the first set having a desirable path bandwidth metric value; b) determining a first common node between two chosen paths from the second set, the first common node being an intermediate node for each of the two chosen paths, a segment of each of the two chosen paths between the common end node and the first common node defining a unique segment for each of the two paths each unique segment having a segment bandwidth metric value; c) determining a path from the two chosen paths based on a desirable segment bandwidth metric value from the segment bandwidth metric value for each of the two unique segments; and d) repeating steps b) and c) retaining the determined path as one of the two chosen paths until all paths in the second set of paths have been chosen.

In accordance with an aspect of the present invention there is provided a computer readable medium having stored thereon computer-executable instructions for determining a path through a network from a source node to a destination node via intermediate nodes, the source node, the destination node and the intermediate nodes being interconnected by a plurality of links, each of the plurality of links having a first metric value and a link bandwidth metric value, the method comprising: a) determining a path from the source node, the path ending at a current node; b) forming expanded paths from the path using selected links from the current node, each of the expanded paths having a path metric value based on the first metric values of the links in each of the expanded paths; c) forming a first set of paths from expanded paths having a common end node based on the path metric value for each expanded path, each path in the first set having a path bandwidth metric value; d) determining a second set of paths formed from paths in the first set having a desirable path bandwidth metric value; e) determining a first common node between two randomly chosen paths from the second set, the first common node being an intermediate node for each of the two chosen paths, a segment of each of the two chosen paths between the common end node and the first common node defining a unique segment for each of the two paths, each unique segment having a segment bandwidth metric value; f) determining a path from the two chosen paths based on a desirable segment bandwidth metric value from the segment bandwidth metric value for each of the two unique segments; g) repeating steps e) and f) retaining the determined path as one of the two chosen paths until all paths in the second set have been chosen; and h) repeating steps a) to g) to further expand the determined path at each intermediate node until the end node for the determined path is the destination node.

Based on a set of paths with equivalent selected metric values, further path selection is performed according to bandwidth to allow for efficient distribution of traffic between paths. Equivalent metric values may be equal values or values within a predetermined range of each other. By selecting those paths with more available bandwidth the present invention provides a better distribution of traffic loads in the network. In this manner potential network congestion can be avoided as traffic loads can be shared among other resources.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION

Figure 1:
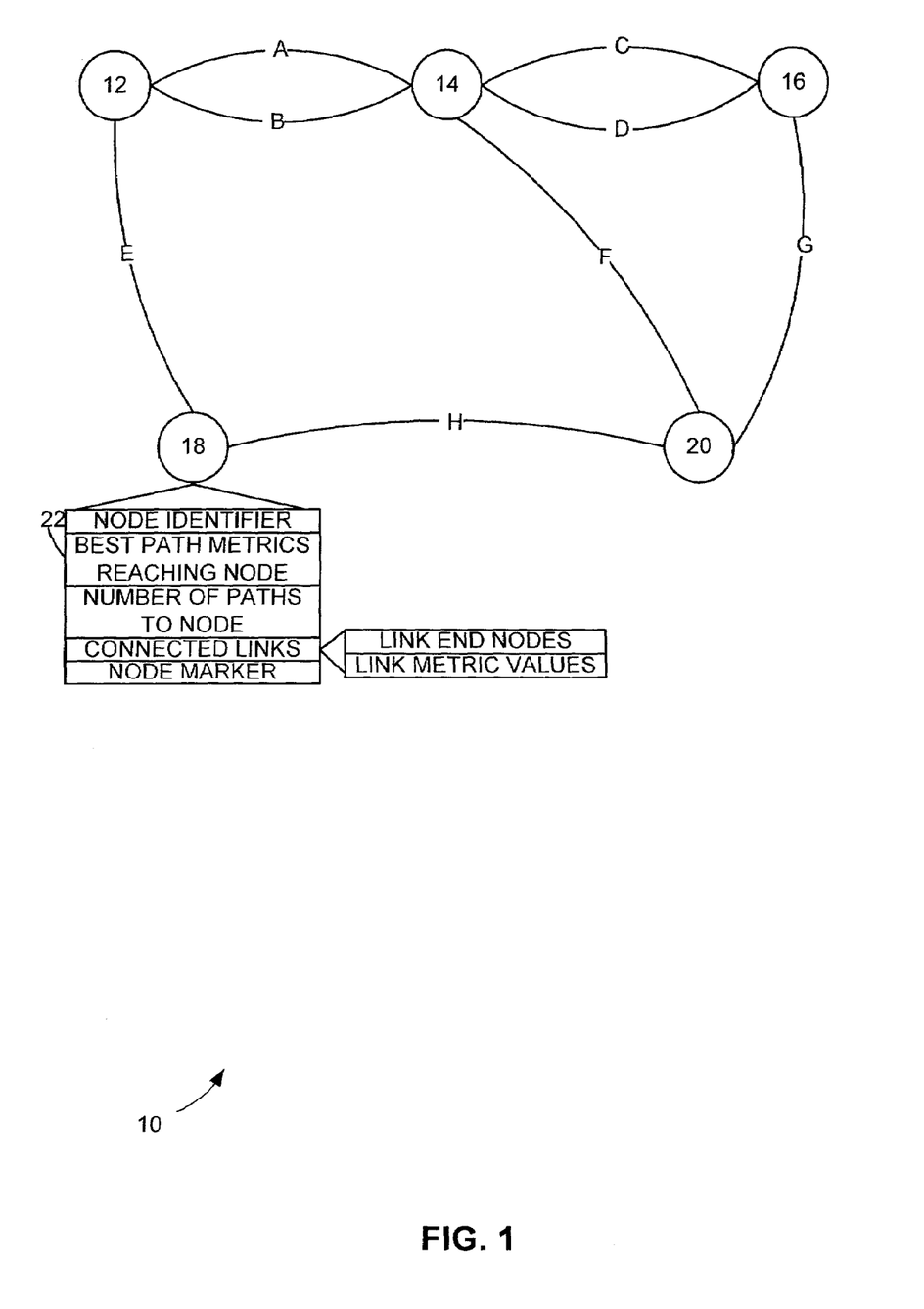
FIG. 1 is an exemplary network diagram depicting an environment in which the w present invention may be implemented.

FIG. 1 shows an exemplary network 10 within which the present invention may operate. In the network 10 a plurality of nodes 12–20 are generally connected to each other by a plurality of links A–H. The configuration by which the links A–H connect the nodes 12–20 can vary and is often dynamic as new links or nodes may be added and existing links A–H or nodes 12–20 may be removed from the network. Multiple links having similar metrics (e.g. cost to operate, delay time, etc.) may connect two nodes (e.g. links A, B connecting node 12 to node 14). That is, links connecting two nodes may be duplicated.

The point from which a path through the network 10 is determined is a source node 12. The desired end of the path through the network 10 is a destination node 20.

Preferred path(s) between the source node 12 and the destination node 20 can be determined via a preferred path determination scheme. The preferred path determination scheme may be a least cost path algorithm, such as Dijkstra's algorithm, that finds path(s) from the source node 12 to the destination node 20 according to a minimization of a metric value assigned to each link A–H, and therefore each path, in the network 10. Metric values assigned to each link A–H are used to determine the desirability of using that link A–H. The metric values may include such things as cost of operating the link, latency of the link, etc.

Each node 14–20 in the network 10 contains node information 22 regarding paths from the source node 12 to that node 14–20. The node information 22 may include a node identifier, information on the links connected to the node such as the end points of the links and metric values, number of paths with desirable metric values to the node and the best selected metric value to the node.

FIGS. 2A to D show a flow chart of a method 100 of selecting a path from the source node 12 to the destination node 20 based on available bandwidth of desirable paths in the network 10 according to an embodiment of the present invention. A path storage data structure is created in step 102 for storing information about links A–H and paths connecting nodes 12–20 in the network 10. The path storage data structure stores all discovered paths from the source node 12 to the other nodes 14–20 in the network 10 during expansion of the paths to the destination node 20. As a path is discovered it is added to the path storage data structure. As a path in the path storage data structure is to be expanded from the end node or last node of the path it is removed from the path storage data structure. Every path encountered may be added to the path storage data structure or, alternatively, only those paths having better metric values than a similar path in the path storage data structure may be added. The source node 12 is inserted into the path storage data structure in step 104 and is used as the starting point for determining paths in the network 10.

A list is created in step 106 to hold paths from the source node 12 to each other node 14–20 encountered during execution of the method 100. This list of paths may have a fixed number of entries for each node 14–20 to limit the number of paths from the source node 12 to each node 14–20 that are held. The paths held in the list of paths are the paths that have a desirable value for a selected metric. These paths are compared against each other to determine the paths having the most desirable bandwidth metric value.

The bandwidth metric value for a link is based on available bandwidth information for each link A–H. Available bandwidth information is stored in the node information 22 for each link A–H connected to the node 12–20. In a typical environment the available bandwidth information is updated when the change of the actual available bandwidth value from a previously stored available bandwidth value is larger than a predetermined threshold. In a preferred embodiment this threshold is set to a sufficiently low value to ensure reasonably accurate information but high enough to ensure that small fluctuations in bandwidth do not affect the stored available bandwidth value.

The bandwidth metric value for a path is determined according to the lowest link bandwidth metric value for an individual link in the path. Thus, a path bandwidth metric value is constrained to be equivalent to the smallest link bandwidth metric value of all individual links in the path regardless of the bandwidth metric values for other links in the path.

Figure 2A:
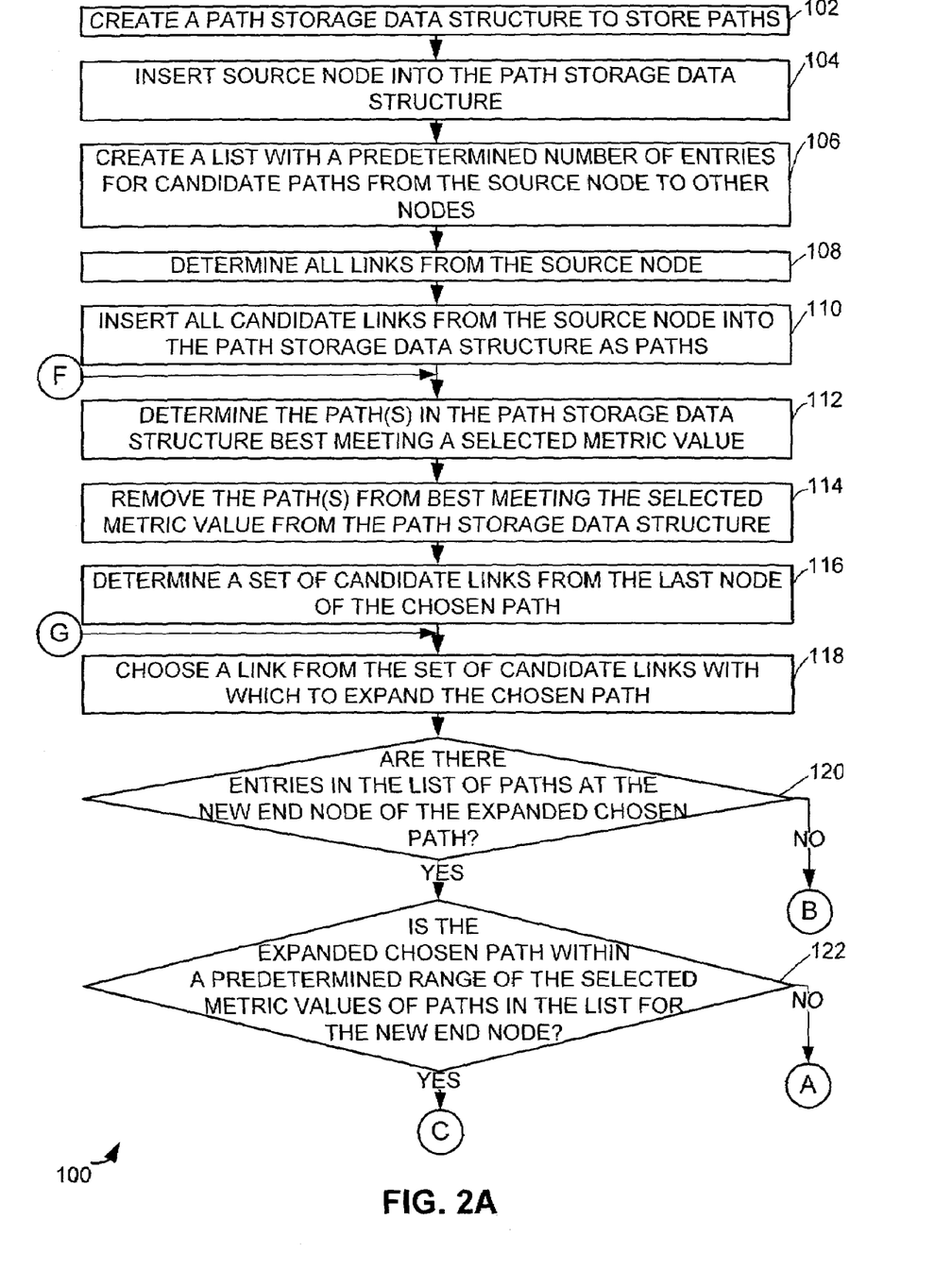
FIGS. 2A to D show a flow chart of a method of selecting a path based on available bandwidth according to an embodiment of the present invention.

In step 108 all links A–B, E leading from the source node 12 are determined along with their metric values. These links A–B, E are inserted into the path storage data structure in step 110 as paths from the source node 12.

The links A–B, E added to the path storage data structure are also inserted into a list for each of the end nodes 14, 18 reached by these links A–B, E.

A path considers the accumulative effect of each of the individual constituent links from the source node 12. That is, the value of the selected metric of a path is the aggregation of the values of the selected metric for each of the links that forms the path. For example, a desirable path may be one that has the lowest aggregated value for the selected metric values from each link. The lowest aggregated value may be used as a base by which the aggregated value of the selected metric for all other paths is compared. The list of paths for each node may include the lowest aggregated value path and those paths that have an aggregated value for the selected metric that is within the predetermined range of the lowest aggregated value.

A path in the path storage data structure having the lowest selected metric value is determined in step 112. This path is chosen to be expanded in future steps. If there are multiple paths in the path storage data structure with the lowest selected metric value then one of these multiple paths is randomly chosen to be expanded. The path that is chosen to be expanded is removed from the path storage data structure in step 114. This keeps only those paths that have not been expanded in the path storage data structure; thus, the path storage data structure keeps track of unexpanded paths.

In step 116 the end node of the chosen path having the lowest selected metric value is examined. All links connected to the end node of the chosen path are found and it is determined if these links are used in paths already in the path storage data structure or in the chosen path. By looking at the end node of each link from the end node of the chosen path it can be determined if the end node of the link has been previously reached through the end node of the chosen path. Those links that reach an end node that has been previously reached through the end node of the chosen path are ignored and all other links to nodes not previously reached through the end node of the chosen path are used to form a set of candidate links.

There may optionally be additional criteria to determine what is a candidate link and what links should form the set of candidate links. For example, a candidate link may be any link A–H connecting one node 12–20 to another node 12–20 that is within a predetermined range of a selected metric value. The selected metric value may be determined by comparing selected metric values for all links from a specific node to each other. The link having, for example, the lowest value of the selected metric may set the standard by which all other links are compared. The set of candidate links may include the link with the lowest value of the selected metric in addition to any other link that has a selected metric value that falls within a predetermined range of the lowest value.

The selected metric may be, for example, a least cost, and the preferred link may have the lowest cost of all links leading from the specific node. Therefore, in this example, any link in the set of candidate links has a selected metric value within a predetermined range of the lowest selected metric value link. The predetermined range is measured from the lowest selected metric value and may be a percentage value of the lowest selected metric value or it may be a fixed value from the selected metric value.

A link from the set of candidate links determined in step 116 is chosen to expand the chosen path from the end node in step 118. It is determined in step 120 if there are already entries in the list of paths at the new end node (i.e. the end node of the candidate link chosen to expand the chosen path). If there are already paths in the list of paths at the new end node then this indicates that the new end node has been previously reached by the expansion of another path.

Figure 2B:
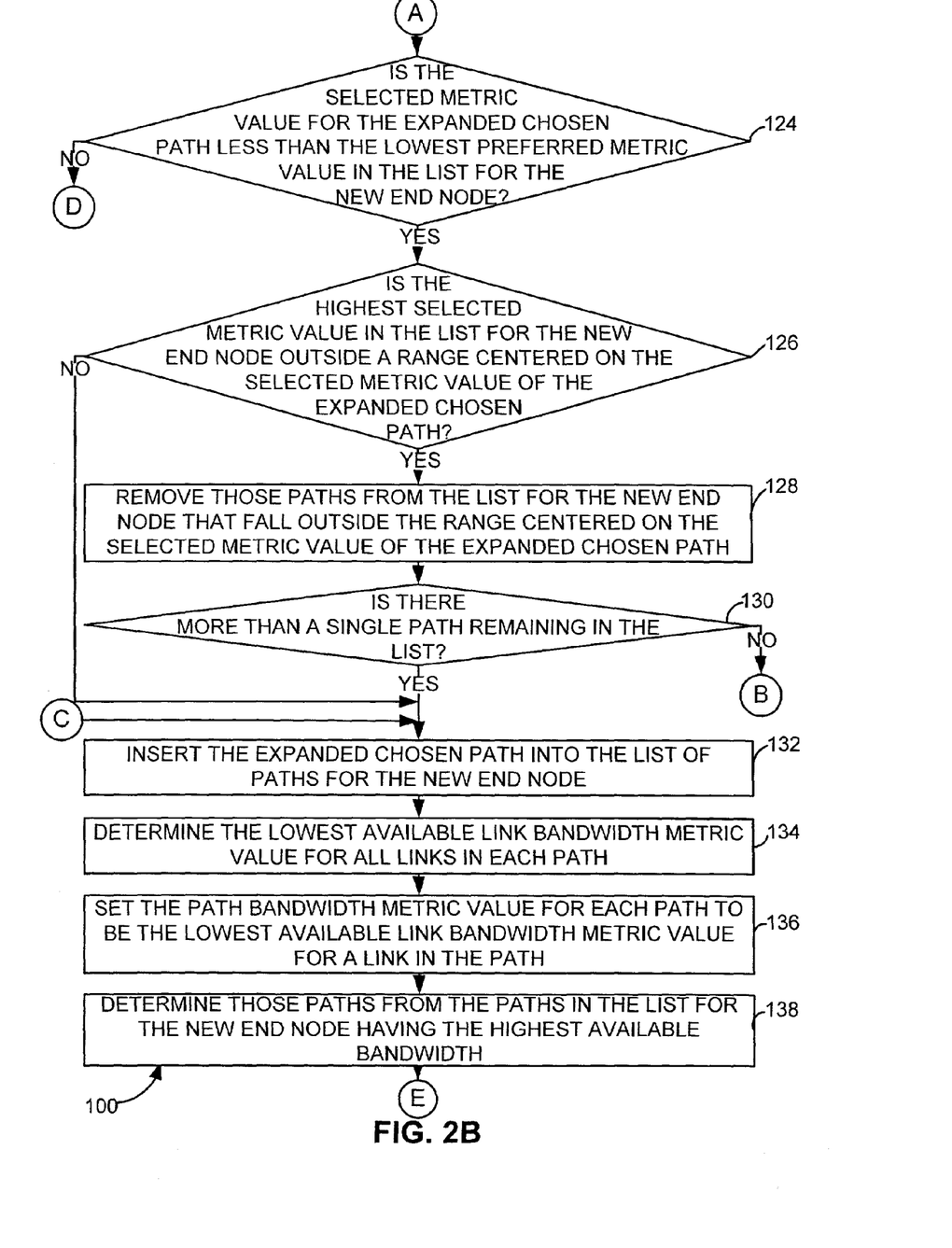

If there are entries in the list of paths for the new end node then one of the expanded chosen paths or a path in the list is chosen for further expansion based on bandwidth metric values for the path. If there are entries in the list of paths for the new end node then it is determined in step 122 if the expanded chosen path has a selected metric value that is within a predetermined range of the selected metric values of paths in the list for the new end node. If the expanded chosen path does not have a selected metric value within the predetermined range then it is determined in step 124 if the selected metric value for the expanded chosen path is less than the lowest selected metric value in the list for the new end node. If the selected metric value is smaller than the lowest value in the list then the expanded chosen path has a new lowest metric value and thus defines a new center for the predetermined range. It is determined in step 126 if there are any selected metric values for paths in the list for the new end node that are outside of the predetermined range when the predetermined range is centered on the metric value for the expanded chosen path. If there are paths in the list outside of this predetermined range they are removed from the list for the new end node in step 128.

After any paths outside the predetermined range have been removed in step 128, it is determined if the number of paths in the list is to be reduced. If it is desired to keep one path in the list then it is determined in step 130 if there is more than a single path remaining in the list for the new end node. Since the expanded chosen path may not have been previously inserted into the list of path, the expanded chosen path may be considered in the counting of the number of paths in the list. If there is more than a single path in the list then the expanded chosen path is inserted in the list in step 132 and bandwidth metric values for paths in the list are used in step 134 to 160 to reduce the number of paths in the list.

If there are no paths in the list for the new end node that are outside the predetermined range centered on the selected metric value for the expanded chosen path, as determined in step 126, then the expanded chosen path is inserted in the list for the new end node in step 132.

If the selected metric value for the expanded chosen path is within a predetermined range of the lowest selected metric value for paths in the list of paths for the new end node then the expanded chosen path is inserted in the list for the new end node in step 132.

Figure 2C:
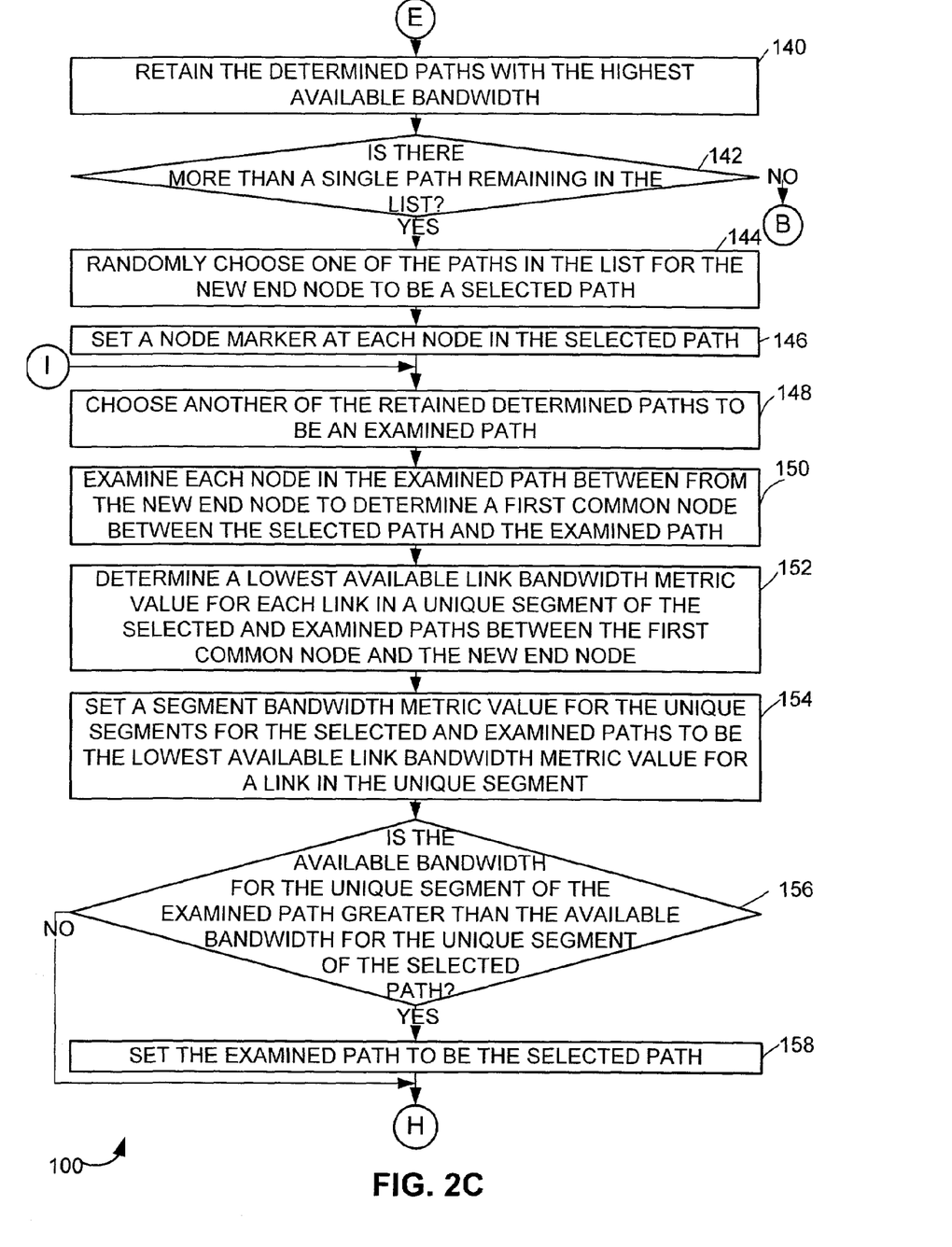

After the expanded chosen path has been added to the list of paths for the new end node, the paths in the list are analyzed according to the bandwidth metrics of each path and each distinct segment in each path. The available bandwidth metric value for every path in the list of paths for the new end node is determined in steps 134 to 136. The available bandwidth metric value for a path is determined according to the bandwidth metric values for the links in the path. The lowest available link bandwidth metric value for a link in the path is determined in step 134. This lowest link bandwidth metric value is set as the bandwidth metric value for the path in step 136.

The paths in the list that have the highest available bandwidth metric value are determined in step 138. The highest available bandwidth metric value may be determined, for example, by an absolute value determination for a path in the list. The paths with the highest available bandwidth metric value are retained in the list in step 140 while all other paths are removed from the list. This removes any paths that clearly do not have desirable path bandwidth metric values.

Again it is determined in step 142 if the number of paths in the list needs to be further reduced. If it is desired to keep one path in the list then it is determined in step 142 if there is more than a single path in the list for the new end node. Further path reduction is performed by examining the paths in the list to determine which paths contain the most desirable distinct segments. If there is only one path in the list then analysis of the paths is complete as the number of paths need not be reduced.

A distinct segment of a path starts where two paths diverge and ends at the node where they converge. The bandwidth metric value for a path is constrained by the link in the path with the lowest link bandwidth metric value. However, the distinct segments of these two paths may have very different bandwidth metric values with one path having a more desirable distinct segment than the other. Steps 144 to 160 deterministically select the path with the higher bandwidth metric value in the distinct segment.

One of the paths in the list is chosen to be a selected path in step 144. This is done randomly, preferably with a uniform distribution, to provide for a random selection of paths that are substantially equal, including the bandwidth metric value for the distinct segments.

The nodes in the selected path are determined and a marker at each of these nodes is set in step 146. The node information 22 for each node contains a node marker that may be used for this process. The node marker may be, for example, a binary number that may be set to denote marked or unmarked and may be reset after the process of determining most desirable distinct segment is completed.

Another path from the list of paths for the new end node is chosen to be an examined path in step 148. Each node in the examined path is assessed to determine a first common node between the examined path and the selected path in step 150. Starting with the new end node, the examined path is traveled backwards to the source node 12. Each node in the examined path is assessed during this process to locate the closest marked node to the new end node. The closest marked node is the first common node between the examined path and the selected path. The distinct segment for the examined path and the selected path is the portion of the path lying between the first common node and the new end node.

The segments of the examined path and the selected path between the first common node and the new end node are the distinct segments that will be compared to determine the path with the highest bandwidth metric value.

Figure 2D:
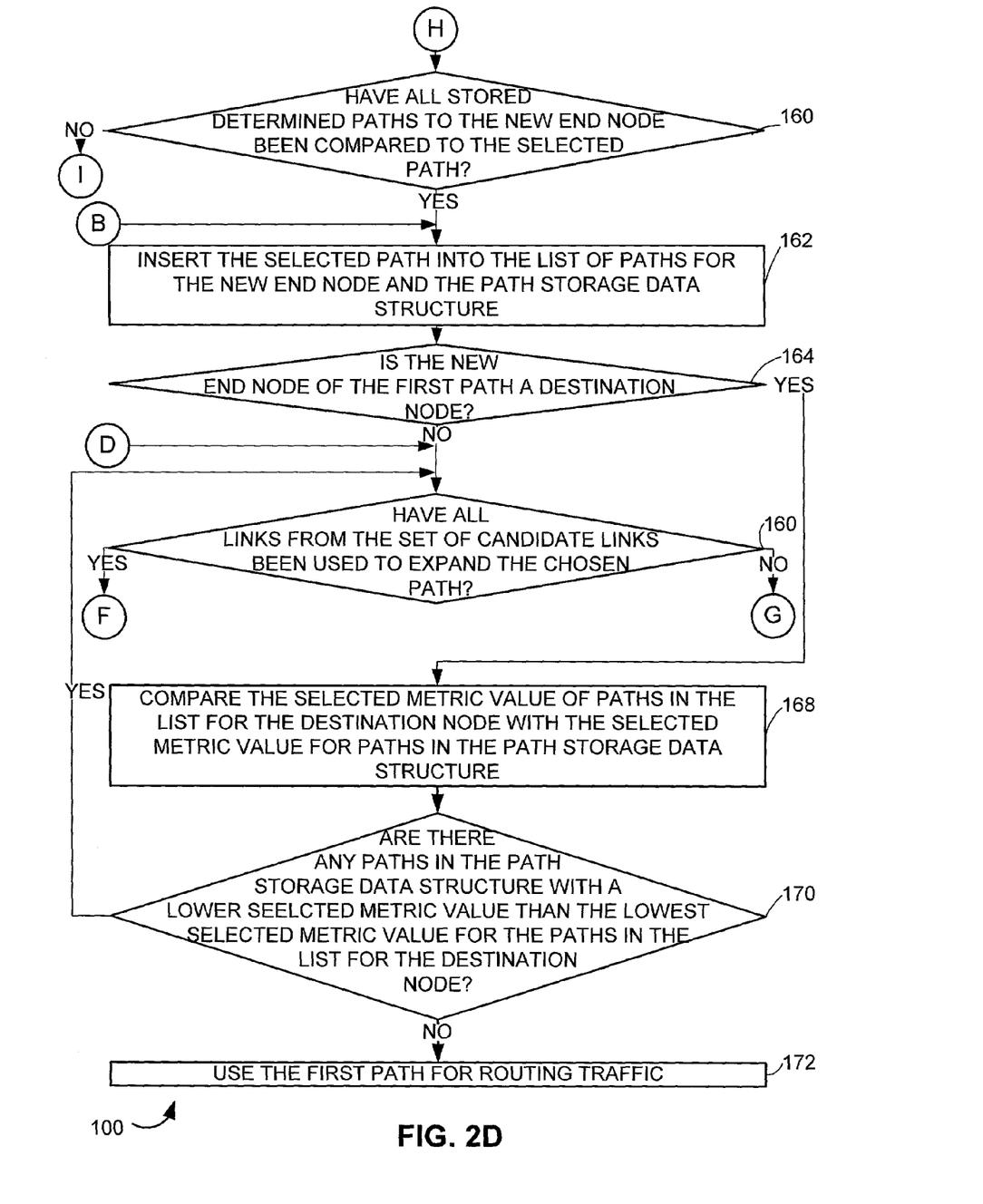

The bandwidth metric value for the unique segment of the selected and examined paths between the first common node and the new end node is determined in steps 152 to 154. As with the bandwidth metric value for the path, the available bandwidth metric value for each unique segment is determined according to the bandwidth metric values for the links in the unique segment. The lowest available link bandwidth metric value for a link in the unique segment is determined in step 152. This lowest link bandwidth metric value is set as the bandwidth metric value for the unique segment in step 154.

It is determined in step 156 if the bandwidth metric value for the distinct segment of the examined path is greater than that for the distinct segment of the selected path. If the bandwidth metric value for the distinct segment of the examined path is greater than that for the selected path then the examined path is set as the selected path in step 158 so that all other paths in the list will be compared to the examined path. In this manner a path with the most desirable bandwidth metric value for the distinct segments will be determined.

Since the examined path is set as the selected path if the examined path bandwidth metric value is greater than the selected path bandwidth metric value then a path with a bandwidth metric value equivalent to the selected path bandwidth metric value will not be set as the selected path.

To provide for random selection of a path with equivalent bandwidth metric values for the distinct segments, the selected path is initially randomly chosen from among all path in the list for the new end node.

In step 160 it is determined whether or not each path in the list for the new end node has been examined. If each path in the list has not been examined then another path is chosen to be the examined path in step 148 and steps 148 to 160 are repeated. If each path in the list has been examined then the selected path replaces all paths in the list for the end node and the selected path is inserted in the path storage data structure in step 162 for consideration during future expansions.

If there were no other entries in the list for the new end node, as determined in step 120, or the list for the new end node contained at most the predetermined number of paths, as determined in steps 130 or 142, then the expanded chosen path is inserted in the list for the new end node and the path storage data structure in step 162.

In step 164 it is determined whether or not the new end node is the destination node 20. If the new end node is not the destination node 20 then it is determined in step 166 if all links from the set of candidate links have been used to expand the chosen path.

If the expanded chosen path has a selected metric value outside of the predetermined range of the lowest selected metric value for a path in the list, as determined in step 122, and higher than the selected metric value in the list, as determined in step 124, then it is determined in step 160 if all links from the set of candidate links have been used to expand the chosen path.

If not all candidate links have been used to expand the chosen path then steps 118 to 166 are repeated with a different candidate link expanding the chosen path. If all candidate links have been used to expand the chosen path then steps 112 to 166 are repeated expanding a different path in the path storage data structure.

If the new end node is the destination node 20 as determined in step 164 then the selected metric values for paths in the list are compared to the selected metric value for paths in the path storage data structure in step 168. It is determined in step 170 if there is a path in the path storage data structure with a lower selected metric value than the lowest selected metric value for any path in the list of paths for the destination node 20.

If there are no paths in the path storage data structure with a lower selected metric value than the paths in the list for the destination node 20 then the determination of a best possible path from the source node 12 to the destination node 20 can stop and the selected path for the destination node 20 can be used for routing traffic in step 172. Since it is not possible to find a path based on expansions of those paths in the path storage data structure that have a lower selected metric value than the paths already in the list for the destination node, expansion of the paths in the path storage data structure is not performed.

If there are paths in the path storage data structure with a lower selected metric value than paths in the list for the destination node 20 then it is determined in step 166 if all candidate links have been used to expand the chosen path and path(s) in the path storage data structure expanded.

FIGS. 2A to D describe an exemplary implementation of the present invention in conjunction with a lowest metric value determination algorithm. Steps 134 to 160 describe selecting a path(s) from among substantially equal path (e.g. equal cost paths as determined by Dijkstra's algorithm) according to the path bandwidth metric value and the bandwidth metric value for a distinct segment of the path.

Figure 3:
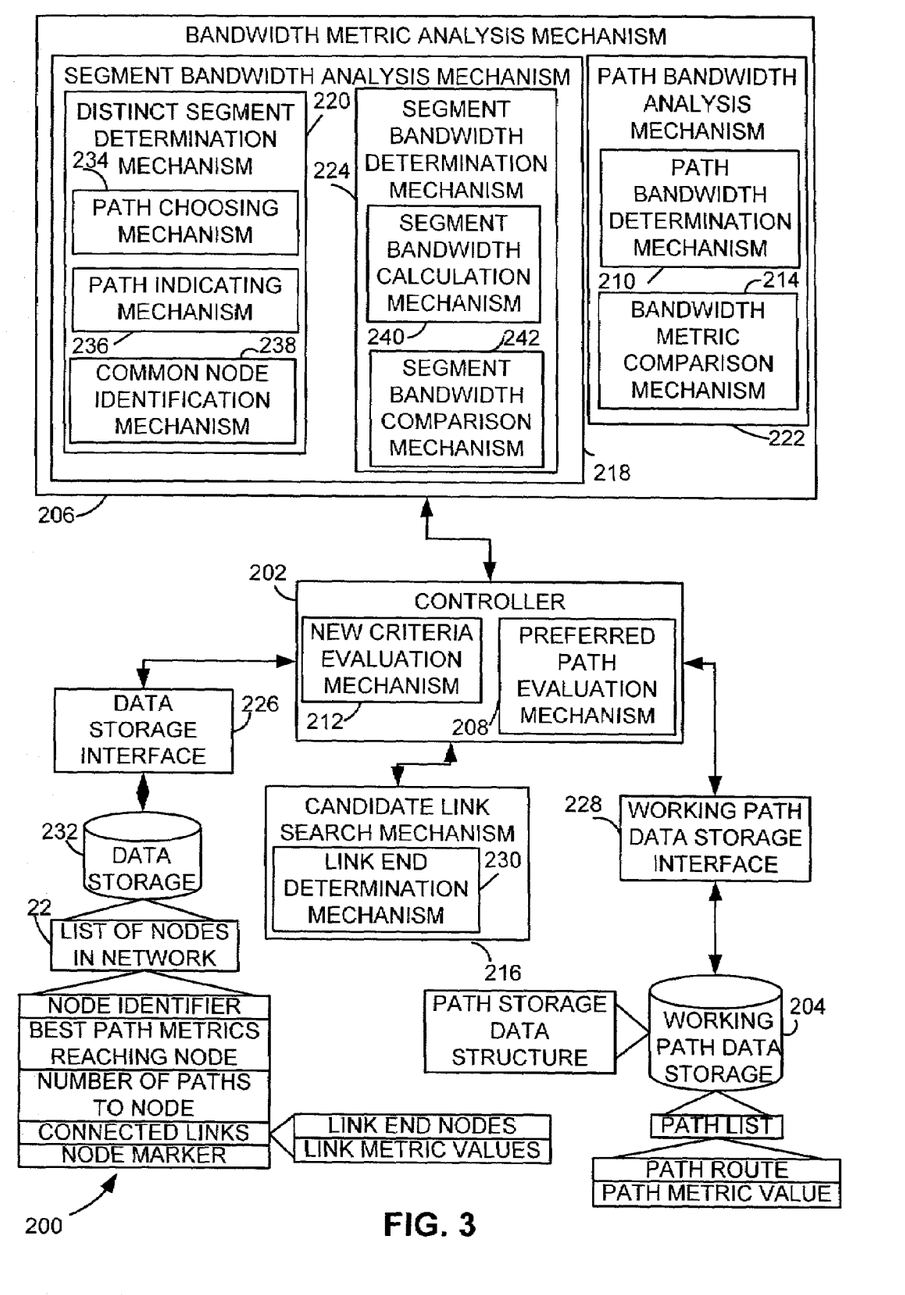
FIG. 3 is a system diagram of a path selection system according to an embodiment of the present invention.

FIG. 3 is a system diagram of a path selection system 200 according to an embodiment of the present invention. The system 200 may be present on the source node 12 to determine a path for traffic to the destination node 20. The system 200 may alternatively be present at a centralized network management application for the entire network 10.

A controller 202 receives a request to determine a path from the source node 12 to the destination node 20 in the network 10. The controller 202 communicates with a working path data storage interface 228 to create a data structure in a working path data storage 204 to store information on paths that meet desired metrics. The working path data storage interface 228 determines a path in the working path data storage 204 having the most desirable metric value. The working path data storage interface 228 locates an end node of a path in the working path data storage 204. The working path data storage 228 also locates information for a path between nodes and chooses a path from the working path data storage 204 to be expanded.

The working path data storage 204 contains information determined by and relevant to determining a path through the network 10. The working path data storage 204 contains path information including a list of paths for each node. The list of paths holds all or a predetermined number of paths from the source node 12 to a node 14–20 in the network 10.

The paths in the list for each node 14–20 are those paths from the source node 12 to node 14–20 for the list that have the most desirable, or in this example lowest, selected metric value. This list of paths contains the route for a path (e.g. source node 12, intermediate nodes 14–18, end node 20 and associated links A–H) and selected metric values. The working path data storage 204 also holds a path storage data structure for holding paths that have been discovered but not expanded to reach the destination node 20.

A data storage 232 contains information on the network 10 and its constituent nodes 12–20 and links A–H. The data storage 232 contains a topology of the network 10 including the nodes 12–20 in the network 10 and the links A–H that connect the nodes 12–20. In addition to the general topology of the network 10, the data storage 204 contains the node information 22 such as a node identifier, a list of links connected to the node including such information as end points of a link and metrics of a link, total number of desirable paths to the node, best metrics of a path to the node and a node marker for use in determining distinct segments of paths. The data storage 232 may contain a link to path information stored in the work path data storage 204.

A data storage interface 226 is an intermediary between the controller 202 and the data storage 232. The data storage 226 locates the node information 22 on specific nodes from the data storage 232.

The controller 202 informs a candidate link search mechanism 216 of the data structure that has been created in the working path data storage 204. A link end determination mechanism 230 of the candidate link search mechanism 216 uses the source node 12 to determine all possible links leading from the source node 12 according to source node information 22 in the data storage 232. A list of all of the links leading from the source node 12 may be added to the working path data structure 204 in association with the source node 12. Alternatively, a list of all links connected to the source node 12 may be kept in the candidate link search mechanism 216. A link end determining mechanism 230 of the candidate link search mechanism 216 determines links from the current node.

A preferred path evaluation mechanism 208 of the controller 202 determines those paths from the source node 12 that have the most desirable values for the selected metrics. The most desirable values for the selected metrics are those with the lowest values or those within a predetermined range of the lowest value. The determination of those paths that have the most desirable metric values may be determined by aggregating all selected metric values for each constituent link of the path. This may result in multiple paths leading to the same node along the same route (i.e. through the same nodes) that are substantially similar. That is, there may be multiple paths through the same route from the source node 12 that have values from selected metric that fall within a predetermine range of the most desirable value from all the paths.

A new criteria evaluation mechanism 212 of the controller 202 re-evaluates paths previously in the list for an end node of a recently expanded path when the most desirable selected metric value changes. For example, if the recently expanded path has a lower selected metric value than the paths previously in the list then the selected metric value for paths previously in the list are re-evaluated using the selected metric value of the recently expanded path.

The working path data storage 204 contains information on paths leading from the source node 12 to the other nodes 14–20 in the network 10. The working path data storage interface 228 chooses one of these paths to be expanded by a preferred path evaluation mechanism 208. The preferred path evaluation mechanism 208 expands the chosen path based on links in the set determined by the candidate link search mechanism 216. The expanded path is evaluated based on an overall value of the selected metric for the path and similar values for similar paths contained in the working path data storage 204.

The controller 202 examines the data structure to determine if the end node in the expanded path has been reached before via a different route. If the end node has been previously reached then a bandwidth metric analysis mechanism 206 examines all possible paths that lead to the end node. The bandwidth metric analysis mechanism 206 examines the bandwidth metric for each path reaching the end node as well as a last distinct segment for each path.

A path bandwidth determination mechanism 210 of the bandwidth metric analysis mechanism 206 determines an available bandwidth metric value for each path in the list for the end node. The link bandwidth metric value for each link in a path is examined to determine the lowest values. The lowest link bandwidth metric value is set as the path bandwidth metric value.

The path bandwidth metric value for each path in the list for the end node is passed to a bandwidth metric comparison mechanism 214. The bandwidth metric comparison mechanism 214 determines those paths having the highest or most desirable path bandwidth metric values. This determination may be based on the absolute highest value, a predetermined range around the absolute highest value, a predetermined desirable value, etc.

The bandwidth metric comparison mechanism 214 removes those paths not having desirable results from the comparison from the list for the end node. This revised list for the end node may be passed to a segment analysis mechanism 218 for further revision depending on the number of paths remaining in the list.

The segment bandwidth analysis mechanism 218 determines those bandwidth metric values for distinct segments for each path in the list for the end node. The distinct segment bandwidth metric values are used for determining those paths with the most desirable bandwidth metric values for the distinct segments. The segments bandwidth analysis mechanism 218 randomly chooses a path in the list for the end node to be a selected path against which other paths will be compared. The segment bandwidth analysis mechanism 218 also chooses on e of the remaining paths in the list to be an examined path. After the examined path has been compared to the selected path the other paths in the list are chosen to be the examined path for comparison with the selected path.

A distinct segments determination mechanism 220 determines the distinct segments closest to the common end node for two paths. The distinct segment determination mechanism 220 traces the selected path and sets the node marker in the node information 22 for each node in the path to denote that the node is contained in the selected path. The distinct segment determination mechanism 220 traces the examined path backwards from the end node until a node for which the node marker is set is reached. This node is the first common node between the selected path and the examined path. The distinct segment for the selected path and the examined path is the portion of the path lying between the first common node and the end node.

A segments bandwidth determination mechanism 224 determines the bandwidth metric value for the distinct segment of the selected oath and the examined path. The bandwidth metric value for the distinct segments is the smallest link bandwidth metric value for any link in the distinct segment. The segment bandwidth determination mechanism 224 compares the segments bandwidth metric value for the examined path with that for the selected path. If the examined path has a more desirable segments bandwidth metric value then it is set as the selected path. All paths in the list for the end node are compared to the selected path in this manner,. The end resulting selected path is the path from the list that has the most desirable path and segments bandwidth metric values.

The controller 202 examines the end node in the expanded paths in the data structure to determine if the destination node has been reached. If the destination node has not been reached then expansion of the paths from the end node continues until the destination node is reached.

The system 200 implements the steps of the method 100 of FIGS. 2A to D in various components (or mechanisms) of the system 200. The component(s) used for the implementation of various steps of the method 100 may vary, as is obvious to one skilled in the art.

An exemplary implementation of the method 100 of FIGS. 2A to D using the system 200 of FIG. 3 will now be described with reference to the network 10 of FIG. 1. For purposes of this example arbitrary values are assigned to each link A–H to represent the selected metric value for each of these links. The method 100 will be used to determine a paths between source node 12 and destination node 20. For simplicity, the method 100 of FIGS. 2A to D will be performed using a predetermined range value of 0. That is, only those paths having the lowest selected metric value will be considered. It will be understood that any of a number of different values may be used for the predetermined range. Further, only those paths having the highest bandwidth metric value(s) will be retained.

| Links(s) | Selected Metric Value | Bandwidth Metric Value |
|---|---|---|
| A | 1 | 2 |
| B | 4 | 1 |
| C | 2 | 3 |
| D | 1 | 4 |
| E | 1 | 2 |
| F | 4 | 3 |
| G | 2 | 5 |
| H | 5 | 4 |

A path storage data structure is created (step 102) to store information on each path from the source node 12 to other nodes 14–20 in the network 10 into which the source node 12 is inserted (step 104). A list of paths for each node is created to hold the paths reaching that node (step 106).

A list of links A, B, E from the source node 12 is determined (step 108) and inserted into the path storage data structure as paths leading from the source node 12 to each of the end nodes 14, 18 of the links A, B, E (step 110). The links from the source node 12 can be determined from the source node information in the data storage 232 including all links connected to the source node 12 and the selected metric values for all of these links.

The paths added to the path storage data structure from the source node 12 are A connecting to node 14 and E connecting to node 18. Link B is not added to the path storage data structure as link A offers a lower selected metric value path to node 14. Since this is the first iteration it is assumed that there are no paths in the list for nodes 14 and 18. The path A is inserted into the list for node 14 and the path E is inserted into the list for node 18.

The path with the lowest selected metric value in the path storage data structure is chosen to be expanded first (step 112). Paths A and E both have the lowest selected metric value of 1. One of these paths is randomly chosen for the first expansion. For example, path A may be expanded from node 14.

Path A is removed from the path storage data structure (step 114) to be expanded at node 14. A set of links from node 14 is determined to include C, D and F (step 116). Links A and B are not considered in the set of links from node 14 as they lead to node 12 to which a path has already been determined (e.g. path containing link A). Links D and F contain the lowest selected metric value leading from node 14 to their respective end nodes so they form the set of links from node 14. Link C is not considered to be one of the candidate links as link D offers a lower selected metric value to node 16.

Link D is chosen (step 118) to expand the chosen path A. The expansion of the chosen path forms a new path AD having a selected metric value of 2.

The stored path information now appears as, where the selected metric value for each path is shown in parentheses:

| Path Storage Data Structure | AD (2) E (1) |
|---|---|
| Node 14 | Path A (1) |
| Node 16 | Path AD (2) |
| Node 18 | Path E (1) |
| Node 20 | |

Since the end node (node 16) of the path AD is not the destination node 20 (step 164) and not all links from node 14 have been chosen to expand the chosen path (step 166), path A is expanded using link F (step 118). This forms path AF to node 20, the destination node. having a selected metric value of 4. Since no other paths have reached node 20 (step 120), path AF is stored in the list for node 20 (step 160). Node 20 is the destination node (step 164); however, there are paths in the path storage data structure with lower selected metric values (steps 168 and 170).

Path E to node 18 has the lowest selected metric value for all paths in the path storage data structure and is chosen to be expanded. The candidate links from node 18 are determined to be link H (step 116). Link H is chosen to expand path E (step 118) forming path EH to node 20, the destination node. Since path AF is already in the list for node 20 (step 120) paths AF and EH are examined to determine the paths with the lowest selected metric value (steps 122 to 126). Path EH has a selected metric value of 6 whereas path AF has a selected metric value of 5. Since the selected metric value of path EH is higher than the selected metric value of path AF, it is not added to the list for the destination node.

Since there is a path in the path storage data structure that has a lower selected metric value than path AF, path AD is expanded. Link G is determined to be the only link from node 16 that can be used to expand path AD. Path ADG ends at node 20, the destination node and has a selected metric value of 5, the same as path AF currently in the list for node 20. The path bandwidth metric value for both paths ADG and AF is determined to be 2. One of paths AF or ADG is randomly chosen to be a selected path (step 142), for example path AF. All nodes in path AF are marked as belonging to path EH (step 146). The remaining path ADG is chosen to be an examined path (step 148) which is then traveled backwards from the destination node 20 trying to find the first marked node signifying a common node with the selected path. The first common node with the selected path is node 14. Thus, for path AF the link F between nodes 14 and 20 is considered to be the distinct segment and for path ADG the links D and G between nodes 14 and 20 is the distinct segment. A bandwidth metric value for the two distinct segments is determined. For path AF the distinct segment bandwidth metric value is 3. For path ADG the distinct segment bandwidth metric value is 4. Since path ADG has a higher distinct segment bandwidth metric value than path AF, path ADG replaces path AF as the selected path and path ADG becomes the only path in the list for node 20. Since node 20 is the destination node and there are no other oaths in the path storage data structure, path ADG is used for routing traffic.

Although the description of the present invention has used the example where the lowest selected metric value is desired, it will be obvious to one skilled in the art that the highest selected metric value may be used. Alternatively, a specific selected metric value may be used as the basis for determining desirability of links and paths.

Embodiments of the present invention may be implemented in any conventional computer programming language. For example, embodiments may be implemented in a procedural programming language (e.g. "C") or an object oriented language (e.g. "C++"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product)."

It is apparent to one skilled in the art that numerous modifications and departures from the specific embodiments described herein may be made without departing from the spirit and scope of the invention.

The invention claimed is:

1. A method of selecting a path from a first set of paths each path having a similar path metric value and a path bandwidth metric value, each path extending through a network from a common source node to a common end node via intermediate nodes, the common source node, the common end node and the intermediate nodes being interconnected by a plurality of links, the method comprising:
   a) determining a second set of paths formed from paths in the first set having a desirable path bandwidth metric value;
   b) determining a first common node between two chosen paths from the second set, the first common node being an intermediate node for each of the two chosen paths, a segment of each of the two chosen paths between the common end node and the first common node defining a unique segment for each of the two paths each unique segment having a segment bandwidth metric value;
   c) determining a path from the two chosen paths based on a desirable segment bandwidth metric value from the segment bandwidth metric value for each of the two unique segments; and
   d) repeating steps b) and c) retaining the determined path as one of the two chosen paths until all paths in the second set of paths have been chosen.

2. The method according to claim 1 wherein the desirable path bandwidth metric value corresponds with a high available bandwidth for a path and the desirable segment bandwidth metric value corresponds with a high available bandwidth for a unique segment.

3. The method according to claim 2 wherein a high available bandwidth for a path corresponds with a high path bandwidth metric value for that path and wherein step a) includes:

generating the second set of paths by identifying those paths in the first set with the highest path bandwidth metric values.

4. The method according to claim 2 wherein each of the plurality of links has a link bandwidth metric value and wherein the path bandwidth metric value for each path is established as the lowest value from link bandwidth metric values for each link in that path.

5. The method according to claim 2 wherein step b) includes:
   choosing two paths from the second set;
   removing a first path and a second path representing the two chosen paths from the second set;
   indicating each intermediate node from the first path as being in the first path;
   examining each intermediate node from the common end node in the second path to identify a first indicated intermediate node of the first path; and
   establishing the first indicated intermediate node as the first common node.

6. The method according to claim 5 wherein the step of indicating each intermediate node includes:
   setting a marking to denote the intermediate nodes in the first path.

7. The method according to claim 2 wherein a high available bandwidth for a unique segment corresponds with a high segment bandwidth metric value for that segment and wherein step c) includes:
   establishing the determined path by identifying the path from the two paths with the unique segment with the highest segment bandwidth metric value.

8. The method according to claim 5 wherein a high available segment bandwidth correspond with a high segment bandwidth metric value and wherein step c) includes:
   comparing the segment bandwidth metric values for the unique segment for the first and second paths; and
   establishing the second path as the determined path if the segment bandwidth metric value for the unique segment for the second path is greater than the segment bandwidth metric value for the unique segment for the first path.

9. The method according to claim 2 wherein each of the plurality of links has a link bandwidth metric value and wherein the segment bandwidth metric value for each unique segment is established as the lowest value from link bandwidth metric values for each link in the unique segment.

10. A method of determining a path through a network from a source node to a destination node via intermediate nodes, the source node, the destination node and the intermediate nodes being interconnected by a plurality of links, each of the plurality of links having a first metric value and a link bandwidth metric value, the method comprising:
   a) determining a path from the source node, the path ending at a current node;
   b) forming expanded paths from the path using selected links from the current node, each of the expanded paths having a path metric value based on the first metric values of the links in each of the expanded paths;
   c) forming a first set of paths from expanded paths having a common end node based on the path metric value for each expanded path, each path in the first set having a path bandwidth metric value;
   d) determining a second set of paths formed from paths in the first set having a desirable path bandwidth metric value;
   e) determining a first common node between two randomly chosen paths from the second set, the first common node being an intermediate node for each of the two chosen paths, a segment of each of the two chosen paths between the common end node and the first common node defining a unique segment for each of the two paths, each unique segment having a segment bandwidth metric value;

f) determining a path from the two chosen paths based on a desirable segment bandwidth metric value from the segment bandwidth metric value for each of the two unique segments;

g) repeating steps e) and f) retaining the determined path as one of the two chosen paths until all paths in the second set have been chosen; and h) repeating steps a) to g) to further expand the determined path at each intermediate node until the end node for the determined path is the destination node.

11. The method according to claim 10 wherein the desirable path bandwidth metric value correspond with a high available bandwidth for a path and the desirable segment bandwidth metric value corresponds with a high available bandwidth for a unique segment.

12. The method according to claim 11 wherein a high available bandwidth for a path correspond with a high path bandwidth metric value for that path and wherein step d) includes:
generating the second set of paths by identifying those paths in the first set with the highest path bandwidth metric values.

13. The method according to claim 11 wherein the path bandwidth metric value for each path is established as the lowest value from link bandwidth metric values for each link in that path.

14. The method according to claim 11 wherein step c) includes:
choosing two paths from the second set;
removing a first path and a second path representing the two randomly chosen paths from the second set;
indicating each intermediate node from the first path as being in the first path;
examining each intermediate node from the common end node in the second path to identify a first indicated intermediate node of the first path; and
establishing the first indicated intermediate node as the first common node.

15. The method according to claim 11 wherein a high available bandwidth for a unique segment corresponds with a high segment bandwidth metric value for that unique segment and wherein step c) includes:
establishing the determined path by identifying the path from the two chosen paths with the unique segment with the highest segment bandwidth metric value.

16. The method according to claim 11 wherein the segment bandwidth metric value for each unique segment is established as the lowest value from link bandwidth metric values for each link in the unique segment.

17. The method according to claim 10 wherein step b) includes:
determining links from the current node;
selecting the determined links from the current node according to end points of each of the determined links;
evaluating each selected link from the current node according to the first metric value for each link; and
holding evaluated links from the current node having desirable metric values; and wherein step c) includes
examining the path metric value for each of the expanded paths; and
choosing expanded paths according to path criteria determined by desirable path metric values.

18. A system for determining a path through a network from a source node to a destination node via intermediate nodes, the source node, the destination node and the intermediate nodes being interconnected by a plurality of links, each of the plurality of links having a first metric value and a link bandwidth metric value, the system comprising:
a data storage for holding path information for a path between the source node and a current node;
a link search mechanism to select links from the current node;
a controller operably connected to the data storage and the link search mechanism to locate and expand a path from the source node to the current node using the selected links to form expanded paths, each of the expanded paths having a path metric value based on the metric values for links in the expanded path and a path bandwidth metric value, and to determine a first set of paths having a common end node according to the path metric value for each of the expanded paths;
a path bandwidth analysis mechanism to determine those paths in the first set having a desirable path bandwidth metric value;
a segment determination mechanism to determine a first common node between two chosen paths from those paths having a desirable path bandwidth metric value, the first common node being an intermediate node for each of the two chosen paths, a segment of each of the two chosen paths between the common end node and the first common node defining a unique segment for each of the two paths, each unique segment having a segment bandwidth metric value; and
a segment bandwidth determination mechanism to determine the determined path from the two chosen paths based on a desirable segment bandwidth metric value from the segment bandwidth metric value for each of the two unique segments.

19. The system according to claim 18 wherein the link search mechanism includes:
a link end determination mechanism for determining links from the current node and selecting the determined links from the current node according to end points of each of the determined links.

20. The system according to claim 18 wherein the desirable path bandwidth metric value corresponds with a high available bandwidth for a path represented by a high path bandwidth metric value for that path and wherein the path bandwidth analysis mechanism includes:
a bandwidth metric identification mechanism to identify those paths in the first set with the highest path bandwidth metric values.

21. The system according to claim 18 wherein the segment determination mechanism includes:
a path choosing mechanism to choose two paths from those paths in the first set with the desirable path bandwidth metric values;
a path indicating mechanism to denote each intermediate node in a first path of the two chosen paths as being in the first path; and
a common node identification mechanism to examine each intermediate node from the common end node in a second path of the two randomly chosen paths to identify a first indicated intermediate node of the first path, the first indicated intermediate node being established as the first common node.

22. The system according to claim 18 wherein the desirable segment bandwidth metric value corresponds with a high available bandwidth for a unique segment represented by a high segment bandwidth metric value for that unique segment and wherein the segment bandwidth determination mechanism includes:
a segment metric identification mechanism to identify the path from the two chosen paths with the unique segment with the highest segment bandwidth metric value, the identified path being established as the determined path.

23. A computer readable medium having stored thereon computer-executable instructions for selecting a path from a first set of paths each path having a similar path metric value and a path bandwidth metric value, each path extending through a network from a common source node to a common end node via intermediate nodes, the common source node, the common end node and the intermediate nodes being interconnected by a plurality of links, the method comprising:
a) determining a second set of paths formed from paths in the first set having a desirable path bandwidth metric value;
b) determining a first common node between two chosen paths from the second set, the first common node being an intermediate node for each of the two chosen paths, a segment of each of the two chosen paths between the common end node and the first common node defining a unique segment for each of the two paths each unique segment having a segment bandwidth metric value;
c) determining a path from the two chosen paths based on a desirable segment bandwidth metric value from the segment bandwidth metric value for each of the two unique segments; and
d) repeating steps b) and c) retaining the determined path as one of the two chosen paths until all paths in the second set of paths have been chosen.

24. The computer-executable instructions according to claim 23 wherein the desirable path bandwidth metric value corresponds with a high available bandwidth for a path represented by a high path bandwidth metric value for that path and wherein step a) includes:
generating the second set of paths by identifying those paths in the first set with the highest path bandwidth metric values.

25. The computer-executable instructions according to claim 24 wherein each of the plurality of links has a link bandwidth metric value and wherein the path bandwidth metric value for each path is established as the lowest value from link bandwidth metric values for each link in that path.

26. The computer-executable instructions according to claim 23 wherein step b) includes:
choosing two paths from the second set;
removing a first path and a second path representing the two chosen paths from the second set;
indicating each intermediate node from the first path as being in the first path;
examining each intermediate node from the common end node in the second path to identify a first indicated intermediate node of the first path; and
establishing the first indicated intermediate node as the first common node.

27. The computer-executable instructions according to claim 26 wherein the step of indicating each intermediate node includes:
setting a marking to denote the intermediate nodes in the first path.

28. The computer-executable instructions according to claim 23 wherein the desirable segment bandwidth metric value corresponds with a high available bandwidth for a unique segment represented by a high segment bandwidth metric value for that unique segment and wherein step c) includes:
establishing the determined path by identifying the path from the two paths with the unique segment with the highest segment bandwidth metric value.

29. The computer-executable instructions according to claim 26 wherein the desirable path bandwidth metric value corresponds with a high available bandwidth for a path represented by a high path bandwidth metric value for that path and wherein step c) includes:
comparing the segment bandwidth metric values for the unique segment for the first and second paths; and
establishing the second path as the determined path if the segment bandwidth metric value for the unique segment for the second path is greater than the segment bandwidth metric value for the unique segment for the first path.

30. The computer-executable instructions according to claim 28 wherein each of the plurality of links has a link bandwidth metric value and wherein the segment bandwidth metric value for each unique segment is established as the lowest value from link bandwidth metric values for each link in the unique segment.

31. A computer readable medium having stored thereon computer-executable instructions for determining a path through a network from a source node to a destination node via intermediate nodes, the source node, the destination node and the intermediate nodes being interconnected by a plurality of links, each of the plurality of links having a first metric value and a link bandwidth metric value, the method comprising:
a) determining a path from the source node, the path ending at a current node;
b) forming expanded paths from the path using selected links from the current node, each of the expanded paths having a path metric value based on the first metric values of the links in each of the expanded paths;
c) forming a first set of paths from expanded paths having a common end node based on the path metric value for each expanded path, each path in the first set having a path bandwidth metric value;
d) determining a second set of paths formed from paths in the first set having a desirable path bandwidth metric value;
e) determining a first common node between two randomly chosen paths from the second set, the first common node being an intermediate node for each of the two chosen paths, a segment of each of the two chosen paths between the common end node and the first common node defining a unique segment for each of the two paths, each unique segment having a segment bandwidth metric value;
f) determining a path from the two chosen paths based on a desirable segment bandwidth metric value from the segment bandwidth metric value for each of the two unique segments;
g) repeating steps e) and f) retaining the determined path as one of the two chosen paths until all paths in the second set have been chosen; and
h) repeating steps a) to g) to further expand the determined path at each intermediate node until the end node for the determined path is the destination node.

32. The computer-executable instructions according to claim 31 wherein the desirable path bandwidth metric value corresponds with a high available bandwidth for a path represented by a high path bandwidth metric value for that path and wherein step d) includes:
  generating the second set of paths by identifying those paths in the first set with the highest path bandwidth metric values.

33. The computer-executable instructions according to claim 31 wherein the path bandwidth metric value for each path is established as the lowest value from link bandwidth metric values for each link in that path.

34. The computer-executable instructions according to claim 31 wherein step e) includes:
  choosing two paths from the second set;
  removing a first path and a second path representing the two chosen paths from the second set;
  indicating each intermediate node from the first path as being in the first path;
  examining each intermediate node from the common end node in the second path to identify a first indicated intermediate node of the first path; and
  establishing the first indicated intermediate node as the first common node.

35. The computer-executable instructions according to claim 31 wherein the desirable path bandwidth metric value corresponds with a high available bandwidth for a path represented by a high path bandwidth metric value for that path and wherein step f) includes:
  comparing the segment bandwidth metric values for the unique segment for the first and second paths; and
  establishing the second path as the determined path if the segment bandwidth metric value for the unique segment for the second path is greater than the segment bandwidth metric value for the unique segment for the first path.

36. The computer-executable instructions according to claim 31 wherein each of the plurality of links has a link bandwidth metric value and wherein the segment bandwidth metric value for each unique segment is established as the lowest value from link bandwidth metric values for each link in the unique segment.

37. The computer-executable instructions according to claim 31 wherein step b) includes:
  determining links from the current node;
  selecting the determined links from the current node according to end point of each of the determined links;
  evaluating each selected link from the current node according to the first metric value for each link;
  holding evaluated links from the current node having desirable metric values; and wherein step c) includes
  examining the path metric value for each of the expanded paths; and
  choosing expanded paths according to path criteria determined by desirable path metric values.

* * * * *